Oct. 27, 1925.
M. PODNAR
1,559,178
AUTOMATIC COUPLING FOR PNEUMATIC TRAIN PIPES
Filed Sept. 12, 1923
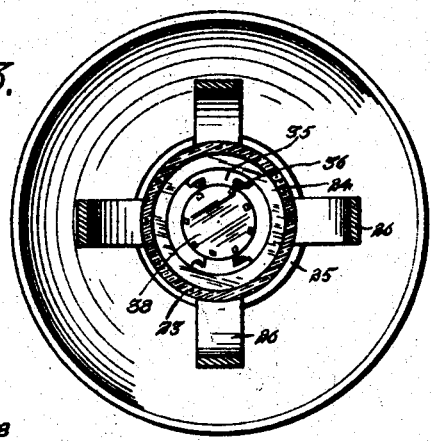
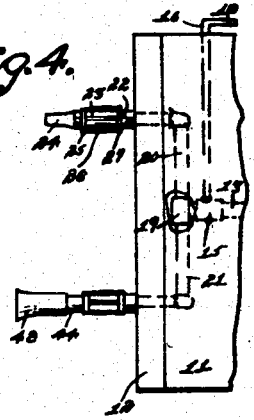
Inventor
Mile Podnar
by Orwig & Hague attys.

Patented Oct. 27, 1925.

1,559,178

UNITED STATES PATENT OFFICE.

MILE PODNAR, OF DES MOINES, IOWA.

AUTOMATIC COUPLING FOR PNEUMATIC TRAIN PIPES.

Application filed September 12, 1923. Serial No. 662,244.

*To all whom it may concern:*

Be it known that I, MILE PODNAR, a subject of the King of Serb-Croat-Slovene, and a resident of Des Moines, in the county of Polk and State of Iowa, United States of America, have invented a certain new and useful Automatic Coupling for Pneumatic Train Pipes, of which the following is a specification.

This invention relates to improvements in coupling devices for connecting the adjacent ends of train pipes such as used in air brakes in common use.

The object of my invention is to provide a coupling device of comparatively simple, durable and inexpensive construction which may be applied to the ends of the train pipes of each individual car in such a manner that the said pipes may be automatically coupled at the time two adjacent cars are coupled together.

A further object is to provide in a coupling device for train pipes, means whereby each end of each of the train pipes may be automatically closed when the adjacent pipe has been disconnected.

A further object is to provide in connection with an automatic coupling device as above described, means whereby the brakes will be more positively actuated in case of an accidental separation of adjacent cars.

A further object is to provide in an automatic coupling device for train pipes, improved means for supporting the coupling members in a yieldable manner so that positive coupling is assured, and the pressure within the train pipe maintained after the coupling has been made.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved coupler showing the manner in which it is installed, segments of the ends of two adjacent cars being shown.

Figure 2 is a detail longitudinal sectional view taken on the line 2—2 of Figure 1.

Figure 3 is an enlarged detail sectional view taken on the line 3—3 of Figure 2.

Figure 4 is a plan view of one end of a car showing the manner in which my improved coupler mechanism is attached thereto.

The numerals 10 and 11 indicate the ends of two box cars, each of which is provided with a sill 12 of the ordinary construction. Extending longitudinally and centrally beneath each of the cars 10 and 11 is a train pipe 13 and 14. The ends of each of the pipes 13 and 14 are provided with shut-off or angle valve 15. Each of the valves 15 is provided with and actuated by means of a rod 16 which extends transversely beneath the car and has one end terminating at one side of the car. The outer end of the rod is supported by means of a bearing 17. The outer end of the rod 16 is also provided with a handle member 18 by means of which the rods 16 may be actuated for the purpose of opening and closing the valve 15. By this arrangement I have provided means whereby the operator may open or close the angle valves without passing between the ends of the cars.

Secured to each of the angle valves 15 is a T 19 designed to support pipes 20 and 21. The said pipes are bent upwardly and thence horizontally through the members 12. The outer end of the pipe 20 is provided with a collar 22 to which is secured a rubber hose 23, the hose being of a length slightly less than half the distance between the members 12. The free end of the hose 23 is mounted on one end of a hollow cylindrical member 24, which I shall term the coupling plug.

The hose 23 is secured in position by means of a band 25 which entirely encircles the hose and is provided with a series of springs 26 designed to extend longitudinally with the hose. The opposite ends of the springs 26 are secured to a band 27 which clamps the hose 23 to the collar 22. The springs 26 are formed thinner at their central portion than at the ends and are curved outwardly in such a manner that the bands 25 and 27 are capable of being moved toward and from each other. The springs 26 are so arranged that the plug 24 will be yieldably held in alinement with the pipe 20. The inner end of the plug 24 is provided with an annular flange 28 so as to form a shoulder against which the outer end of the band 25 may rest, as clearly shown in Figure 2. A similar shoulder is formed on the collar 22 so that as the band 25 is moved toward the band 27, the pressure exerted by the springs 26 will be applied to said shoulders.

The outer end of the plug 24 is formed somewhat tapered and has its end provided with a conical opening or valve seat 29 to receive a conical valve 30 mounted on a rod 31. The outer end of the rod 31 is screw threaded at 32 and designed to receive a nut 33. The valve 30 is designed to rest against one end of an enlarged portion 34 of the rod 31. The nut 33 is designed to lock the valve in position. The outer end of the rod 32 extends beyond the end of the valve a considerable distance for purposes hereinafter made clear.

The rod 31 is slidably mounted in a supporting bar 35 mounted in the opening of the plug 24, as clearly shown in Figures 2 and 3. The member 35 is of a length equal to the diameter of the opening and secured in position by means of rivets 36, and of a width considerably less than the diameter of the opening to permit an air passage around each of its edges.

The member 35 is provided with a small cylinder 37 provided with a head 38. The cylinder 37 is designed to receive an air plunger 39 which is secured to the inner end of the rod 31. One of the walls of the cylinder 37 is provided with a by-passage 40 having a controlling valve 41. The member 34 is provided with a spring 42 for the purpose of holding the valve 30 yieldably closed.

The pipe 21 is provided with a set of springs and an air hose similar to the one described for the pipe 20 and indicated by the numeral 43, and a plug member similar to the plug 24 with the exception that its outer end is provided with a cylindrical portion 44 in place of the tapered portion of the plug 24. The said cylindrical portion is designed to receive a rubber sleeve 45 provided with a disk 46 which extends transversely through the central portion of the sleeve, and the said disk being provided with an opening 47. The disk 46 is designed to rest normally against the outer end of the member 44.

The sleeve 45 is mounted in the smaller end of a bell shaped coupling member 48. The said smaller end is screw threaded to the member 44. The member 44 is provided with a valve mechanism similar to the one for the plug 24. The plug 24 is designed to enter the bell shaped coupling member and to enter the sleeve 45, and have its end rest adjacent to the disk 46 when the cars are in a coupled position, the various parts being of such length that the springs 26 will exert a pressure for holding the ends of the members 24 and 44 firmly against the disk 46, and an air tight joint thereby provided.

The tapered end of the plug 24 entering the outer end of the sleeve 45 provides further means for making an air tight joint.

When the members are in a coupled position as shown in Figure 2, the outer ends of the rods 31 will rest adjacent to each other and move the valves to open position so that a free air passage may be established between the two coupling members with the opening 29.

Referring to Figure 4, it will be seen that the pipe 20 is provided with the plug member 24 and the pipe 21 provided with the bell shaped coupling member 48. The end of the opposite car is provided with a similar arrangement, and so arranged as to mate with the coupling members of the first car. By this arrangement it will be seen that the cars may be reversed end for end and the coupling still accomplished.

Assuming that it is desired to separate two cars, the brakeman simply releases the coupling pin of the draw bar coupling device. This permits the two cars to separate and the plug 24 to be pulled out of the bell shaped member 48. When this takes place, the springs 42 will move the valves 30 to a closed position, thereby closing the ends of the train pipes and permitting the pressure therein to be maintained and the brakes maintained in a released position.

In the actual operation of trains, however, on the road, this is not desirable due to the fact that if two cars should be accidentally separated, the separated portion of the train would have no means of setting the brakes due to the fact that the brakes, as operated under the Westinghouse and New York system are automatically closed by the reduction of the train pressure. This reduction would not be permitted if the valves 30 were closed immediately.

To overcome this difficulty, I have provided the cylinder 37 and the piston or plunger 39, which simply acts as a dash pot to retard the action of the valves 30. The valves 30 are held open a sufficient time to permit a substantial reduction of the train pipes, permitting the brakes to automatically set. The speed at which the valves 30 are closed is regulated by means of the set screw 41 in the by-pass 40.

By this arrangement it will be seen that if one or more cars of the train should become separated from the balance of the train, the separated cars will have their brakes automatically set, while that portion of the train which is attached to the engine will have its brakes also temporarily set. This will give the engineer warning that a portion of the train has been separated. After the brakes of the front portion of the train have been temporarily set, the front one of the valves 30 will close and the train pressure will again be resumed in that portion of the train and the brakes are then under the control of the engineer.

When it is desired to switch a number of the cars from the train, the angle valves 15 may be closed by means of the levers 18 and the rod 16, and the switching may be accomplished in the regular manner.

It will be seen that the switching of some of the cars from the main train under certain conditions may be maintained without closing the angle valves 15, but the brakes will be automatically set without any further attention of the brakeman, and when the train is recoupled, the train pipe is automatically placed in operative relation with the engine, which will provide a considerable saving of time in switching cars under certain condition. In fact the only time it would be really desirable to close the angle valves 15 would be when it is desired to make what is commonly known as a fly switch. This is accomplished by the very rapid movement of the train in the reverse direction with the coupling disconnected, suddenly stopping the engine, which permits the disconnected portion of the train to take the switch. In this case, the valve 30 will probably close too quickly and cause the brakes to be set before the cars have reached their proper position on the switch.

Thus it will be seen that I have provided an automatic coupler for train pipes of simple, durable and inexpensive construction which automatically couples the ends of a train pipe without the necessity of the brakeman entering between the ends of the cars, thereby eliminating the danger of injury.

I claim as my invention:

1. In combination with one end of a train pipe, a coupling plug, a bell shaped coupling member, means for yieldably mounting each of said members spaced apart and parallel with each other in such a manner that when two cars equipped with said device are connected together in operative relation, the plug member of one car will enter the bell shaped member of the opposite car, each of said members being provided with an air passage communicating with the main train pipe and in communication with each other when in coupled relation, means in each of the bell shaped members and plug members for automatically closing the communicating openings through them, and means for retarding the action of said closing means.

2. In combination with one end of a train pipe, a coupling plug, a bell shaped coupling member, means for yieldably mounting each of said members spaced apart and parallel with each other in such a manner that when two cars equipped with said device are connected together in operative relation, the plug member of one car will enter the bell shaped member of the opposite car, each of said members being provided with an air passage communicating with the main train pipe and in communication with each other when in coupled relation, means in each of the bell shaped members and plug members for automatically closing the communicating openings through them, means for retarding the action of said closing means, and means for adjusting the action of the last said means.

3. An automatic coupler for train pipes comprising a T adapted to be connected to one end of a train pipe and provided with branch pipes, the end of said branch pipes being spaced apart and parallel with each other and longitudinal with the train, a collar for the outer end of each of said pipes, a flexible hose for said collar, a plug member operatively connected with the free end of one of said hose members and a bell shaped member connected with the free end of the opposite hose member, means for yieldably supporting said plug member and said bell shaped members in parallel relation with each other and for yieldably supporting said members against longitudinal movement, said yieldable means comprising a band supported on each end of said hose, each of said bands being provided with a series of spring members extending parallel with said hose, said spring members being bulged outwardly and thinner at their central portions.

4. In a device of the class described, an automatic coupling member for one end of a train pipe having a communicating passage with said train pipe, a valve seat in the free end of said coupling member, a valve for said seat, a spring for moving said valve to a closed position, a dash pot for retarding the closing action of said spring, and means for adjusting the action of said dash pot.

Des Moines, Iowa, June 29, 1923.

MILE PODNAR.